United States Patent Office 3,424,575
Patented Jan. 28, 1969

3,424,575
RECOVERY OF COPPER FROM ACID COPPER SULFATE SOLUTIONS
John T. Long, Jr., Phoenix, Ariz., assignor to Chemetals Corporation, New York, N.Y., a corporation of New York
No Drawing. Filed Aug. 10, 1965, Ser. No. 478,747
U.S. Cl. 75—109          3 Claims
Int. Cl. C22b *15/12*

ABSTRACT OF THE DISCLOSURE

The extraction and the recovery of copper from an acid copper sulfate solution containing an oxidizing agent is accomplished by boiling the acid solution for a sufficient time to inactivate the oxidizing agent, cooling the acid solution, adding a metal above copper in the displacement series to the cooled acid solution in sufficient amount to precipitate the desired amount of copper and removing therefrom the precipitated copper.

---

This invention relates to the recovery of copper and more particularly it relates to a process for the complete recovery of copper from an acid copper sulfate solution containing an oxidizing agent by boiling the acid solution prior to precipitating the copper with metallic iron.

When stripping the excess copper plating from various products, a sulfuric acid solution containing an oxidizing agent or agents is used to dissolve the excess copper from the product. The oxidizing agents usually added to sulfuric acid are hydrogen peroxide and/or ammonium persulfate. The stripped copper in solution with the oxidant and sulfuric acid is usually discarded since no process is available which will permit economic recovery of the copper. The spent or waste solutions, however, cannot be indiscriminately discarded or turned into city sewers or rivers because the high copper content, usually 20 to 30 grams/liter, is lethal to aquatic life. Even an amount of copper from 0.1 to 2.0 p.p.m. will kill trout, bass, and catfish, as well as algae and other aquatic life. The copper solutions must thus be discarded in a safe area, adding more costs to the stripping operations in addition to the loss of copper. It is important, therefore, that the copper is removed from the acid solutions before they are discarded into the sewers or rivers.

The recovery of the dissolved copper from the spent solutions by simple cementation with iron has not been found to be practical. When one equivalent of iron is added to a typical acid solution containing 26 grams/liter of copper, an oxidant, and sulfuric acid, only 7.6% of the copper is removed. Moreover, when two equivalents of iron are added to the same solution, only 72.6% of the copper is removed. This more than doubles the content of the metal in the solution that is discarded. Also, since the copper is not completely removed from the spent solution, the danger to the aquatic life still exists.

In accordance with this invention, it has been found that if the oxidant in the spent solution is removed or neutralized, then all the copper can be recovered with less than about a 1.5 equivalents of iron, thus eliminating the danger of the discarded spent solutions in the sewers and rivers and at the same time recover the copper values.

The present invention provides a process by which copper can be completely recovered from an acid copper sulfate solution containing an oxidizing agent. According to this invention, the copper can be recovered inexpensively, efficiently, and without the use of a great amount of metallic iron. This is accomplished by boiling the acid solution for a sufficient amount of time to remove or neutralize the oxidizing material in the acid solution prior to precipitating the copper with metallic iron. It has been found that boiling the spent acid oxidizing liquors for a period of 15 to 30 minutes reduces the oxidant sufficiently so that the copper can be completely recovered by precipitation with metallic iron.

Broadly this invention provides a process for completely recovering copper from an acid copper sulfate solution containing an oxidizing agent which comprises boiling the acid solution for a sufficient time to neutralize or inactivate the oxidizing agent in the acid solution, adding less than about 1.5 equivalents of metallic iron to the acid solution (advantageously cooled) and precipitating therefrom the copper. The equivalent of the iron is based on the amount of copper contained in the acid solution.

The acid solution may be boiled by any well known conventional means to a temperature of generally about 214° F. for a period of about 15 to 30 minutes. The boiling of the acid solution will remove or neutralize the oxidizing material in the acid solution and thereby permit the full recovery of the copper with a minimum of metallic iron being required. The cost of the heat is nominal in comparison with that of the metallic iron that would otherwise be required for the complete recovery of the copper. The oxidizing material could be removed or destroyed by using an easily oxidizable material or reducing agent such as hydrogen but simple boiling is most advantageous.

The acid solution may be cooled by any well known means in the art to the ambient conditions which is advantageous for the recovery of copper from the acid solution.

The amount of metallic iron added to the cooled acid solution is based on the calculated amount of copper contained in the said solution. Metallic zinc or any metal above copper in the displacement series may be added to the acid solution, but iron is most advantageous. According to this invention, about 1.5 equivalents of metallic iron is added to the solution to recover 100% of the copper, i.e., less than about 132 pounds of iron is required to recover 100 pounds of copper. The amount of iron or metal can be varied by partial neutralization of the acid solution with, e.g., lime, which can reduce the acidity of the solution and thereby lower the iron requirement. The present invention is advantageous over existing methods employed in recovering copper, in that such methods recover less than 75% of the copper with 2.0 equivalents of copper. The existing methods would therefore require more than 2.0 equivalents of iron to completely recover the copper as is achieved by this invention with less than about 1.5 equivalents of iron.

The following example will further illustrate the advantages of the present invention for recovering copper from an acid copper sulfate solution as described hereinabove.

EXAMPLE

In this example a typical waste solution containing copper was treated as described hereinbelow.

The solution was a waste ammonium persulfate having a typical dark blue color of $CuSO_4$. The solution was saturated with chlorine and had an oxidizing power equal to a 0.4 N solution of an oxidizing agent. The solution had a pH of 0.7 and contained:

|  | Grams/liter |
|---|---|
| Total sulfate | 249.6 |
| Free sulfuric acid | 5.5 |
| Copper | 26.6 |

The solution was boiled for less than about 30 minutes at about 214° F. and cooled to ambient conditions. 1.5 equivalents of iron was added to the cooled acid solution. All the copper was precipitated and recovered from the solution.

I claim:
1. The method of recovering copper from an acid copper sulfate solution containing an oxidizing agent which comprises: (a) boiling the acid solution for a sufficient time to inactivate the oxidizing agent, (b) cooling the acid solution, (c) adding a metal above copper in the displacement series to the cooled acid solution in sufficient amount to precipitate the desired amount of copper, and (d) removing therefrom the precipitated copper.

2. The method of claim 1 in which the metal added to the cooled acid solution is metallic iron.

3. The method of claim 1 in which less than about 1.5 equivalents of metallic iron is added to the cooled acid solution, said equivalent is based on the amount of copper contained in the acid solution.

References Cited

UNITED STATES PATENTS

| | | |
|---|---|---|
| 3,301,542 | 1/1967 | Medford et al. _____ 75—109 |
| 2,899,272 | 8/1959 | Flach et al. _____ 23—114 |
| 96,525 | 11/1869 | Wilcox _____ 75—109 |

OTHER REFERENCES

Mellor, Comprehensive Treatise on Inorganic and Theoretical Chemistry, vol. 10, 1930, pp. 475–477.

L. DeWAYNE RUTLEDGE, *Primary Examiner.*

T. R. FRYE, *Assistant Examiner.*

U.S. Cl. X.R.

75—117, 101